(12) United States Patent
Lee et al.

(10) Patent No.: US 8,877,373 B2
(45) Date of Patent: Nov. 4, 2014

(54) ELECTRODE FOR A RECHARGEABLE LITHIUM BATTERY, AND A RECHARGEABLE LITHIUM BATTERY FABRICATED THEREFROM

(75) Inventors: Sang-Min Lee, Suwon-si (KR); Goo-Jin Jeong, Suwon-si (KR); Nam-Soon Choi, Suwon-si (KR); Min-Seok Sung, Suwon-si (KR); Yong-Mook Kang, Suwon-si (KR); Sung-Soo Kim, Suwon-si (KR); Leif Christensen, St. Paul, MN (US)

(73) Assignees: Samsung SDI Co., Ltd., Yongin-si (KR); 3M Innovative Properties Company, St. Paul, MN (US)

( * ) Notice: Subject to any disclaimer, the term of this patent is extended or adjusted under 35 U.S.C. 154(b) by 1431 days.

(21) Appl. No.: 11/939,504

(22) Filed: Nov. 13, 2007

(65) Prior Publication Data

US 2008/0226984 A1 Sep. 18, 2008

(30) Foreign Application Priority Data

Nov. 20, 2006 (KR) .................. 10-2006-0114541

(51) Int. Cl.
*H01M 6/14* (2006.01)
*H01M 4/62* (2006.01)
*H01M 6/00* (2006.01)
*H01M 4/24* (2006.01)
*H01M 10/0525* (2010.01)
*H01M 10/0568* (2010.01)
*H01M 4/04* (2006.01)
*H01M 4/13* (2010.01)
*H01M 4/02* (2006.01)

(52) U.S. Cl.
CPC ........ *H01M 4/62* (2013.01); *H01M 2300/0025* (2013.01); *H01M 10/0525* (2013.01); *H01M 10/0568* (2013.01); *Y02E 60/122* (2013.01); *H01M 4/049* (2013.01); *H01M 4/621* (2013.01); *H01M 2004/021* (2013.01); *H01M 4/0404* (2013.01); *H01M 4/13* (2013.01)
USPC ........... 429/207; 429/232; 429/212; 29/623.5

(58) Field of Classification Search
USPC .......................... 429/207, 232, 212; 29/623.5
See application file for complete search history.

(56) References Cited

U.S. PATENT DOCUMENTS 5,279,910 A * 1/1994 Sasaki et al. .................. 429/213
5,961,671 A * 10/1999 Guindy et al. ............... 29/623.1

(Continued)

FOREIGN PATENT DOCUMENTS

EP 1 098 378 A1 5/2001
EP 1098378 A1 * 5/2001 .............. H01M 2/16

(Continued)

OTHER PUBLICATIONS

European Search Report dated Feb. 6, 2008, for corresponding European application 07120429.1, indicating relevance of references listed in this IDS.

(Continued)

*Primary Examiner* — Karie O'Neill Apicella
(74) *Attorney, Agent, or Firm* — Christie, Parker & Hale, LLP

(57) ABSTRACT

An embodiment of the present invention provides an electrode for a rechargeable lithium battery, including: a current collector; and an active material layer on the current collector, wherein the active material layer includes an active material adapted to reversibly intercalate and deintercalate lithium ions, a binder, and a pore-forming polymer.

6 Claims, 3 Drawing Sheets

(56) References Cited

U.S. PATENT DOCUMENTS

| | | | |
|---|---|---|---|
| 6,051,340 | A | 4/2000 | Kawakami et al. |
| 2002/0039680 | A1* | 4/2002 | Hwang et al. ............... 429/218.1 |
| 2003/0118904 | A1 | 6/2003 | Hosokawa et al. |
| 2005/0095504 | A1* | 5/2005 | Kim et al. ..................... 429/246 |
| 2005/0221194 | A1* | 10/2005 | Cho et al. ....................... 429/309 |
| 2005/0260501 | A1* | 11/2005 | Okumura et al. ............. 429/317 |

FOREIGN PATENT DOCUMENTS

| | | |
|---|---|---|
| EP | 1 113 511 A1 | 7/2001 |
| JP | 6-349482 | 12/1994 |
| JP | 2000-113876 | 4/2000 |
| JP | 2000-353512 | 12/2000 |
| JP | 2002-083589 | 3/2002 |
| JP | 2003-242965 | 8/2003 |
| JP | 2003-303625 | 10/2003 |
| KR | 10-0378007 | 3/2003 |

OTHER PUBLICATIONS

Japanese Office action dated Aug. 17, 2010, for corresponding Japanese Patent application 2007-171085, noting listed references in this IDS.

Patent Abstracts of Japan, Publication No. 06-349482; Date of Publication: Dec. 22, 1994; in the name of Takehito Mitachi et al.

Patent Abstracts of Japan, Publication No. 2003-242965; Date of Publication: Aug. 29, 2003; in the name of Robert S. Rubino et al.

Korean Patent Abstracts for Registered Korean Patent 10-0378007, Publication No. 1020020039823 A; Date of Publication: May 30, 2002; in the name of Su Seok Choi et al.

* cited by examiner

ELECTRODE FOR A RECHARGEABLE LITHIUM BATTERY, AND A RECHARGEABLE LITHIUM BATTERY FABRICATED THEREFROM

CROSS-REFERENCE TO RELATED APPLICATION

This application claims priority to and the benefit of Korean Patent Application No. 10-2006-0114541 filed in the Korean Intellectual Property Office on Nov. 20, 2006, the entire contents of which are incorporated herein by reference.

BACKGROUND OF THE INVENTION

1. Field of the Invention

The present invention relates to an electrode for a rechargeable lithium battery and a rechargeable lithium battery fabricated therefrom.

2. Description of the Related Art

Rechargeable lithium batteries have recently drawn attention as power sources for small portable electronic devices. These batteries use organic electrolyte solutions and therefore have twice the discharge voltage of a conventional battery using an alkali aqueous solution. Accordingly, lithium rechargeable batteries have high energy density.

Lithium-transition element composite oxides being capable of intercalating lithium, such as $LiCoO_2$, $LiMn_2O_4$, $LiNiO_2$, $LiNi_{1-x}Co_xO_2$ (0<x<1), $LiMnO_2$, and so on, have been researched for use as positive active materials in rechargeable lithium batteries.

Lithium metals have been used as negative active materials in rechargeable lithium battery. However, the cycle-life (or lifespan) of the batteries may be shortened due to formation of dendrites when the lithium metals are used. Therefore, carbonaceous materials, such as amorphous carbon, crystalline carbon, etc., have recently been used as the negative active materials in place of lithium metals. The carbonaceous negative active materials can inhibit the formation of dendrites, provide relatively flat voltage characteristics at relatively low potentials, and have good cycle-life characteristics. However, a carbonaceous negative active material has relatively high reactivity with an organic electrolyte solution, and a relatively high diffusion rate of lithium. As such, in a rechargeable lithium battery with a carbonaceous negative active material, the electric power characteristics, initial irreversible capacity, and electrode swelling at charge and discharge need to be controlled. In addition, there is a need to improve energy density of a rechargeable lithium battery. In order to improve cycle-life, a lithium alloy may be used as a negative active material. For example, a negative electrode may include a metal not alloyed with lithium and a metal alloyed with lithium. Here, the metal not alloyed with lithium acts as a current collector, and the metal alloyed with lithium forms an alloy with lithium ions that are released from a positive electrode during charging. Therefore, the negative electrode includes lithium during charging, and the alloy functions as a negative active material. However, the lithium alloy cannot provide satisfactory battery characteristics.

In addition, metal negative active materials such as silicon (Si), tin (Sn), a compound including Si or Sn, etc. may be used as a substitute for the carbonaceous material. However, the Si or Sn has a relatively large irreversible capacity problem. Particularly, Si undergoes serious shrinkage or expansion during charge and discharge and thereby a Si negative active material may be detached resulting in deterioration of cycle-life of the rechargeable lithium battery. Tin oxide may also be used as an alternative to the carbonaceous negative active material. However, the metal negative active material has 30% or less initial Coulomb efficiency. Further, as lithium is continuously intercalated and deintercalated to generate a lithium-metal alloy, the capacity and cycle-life are decreased and therefore it has not yet been commercialized.

SUMMARY OF THE INVENTION

An aspect of an embodiment of the present invention is directed toward an electrode for a rechargeable lithium battery that can improve cycle-life of a battery due to buffering function against a volume change of an active material, and a rechargeable lithium battery including the same.

Another aspect of an embodiment of the present invention is directed toward a rechargeable lithium battery having high energy density and excellent cycle-life characteristics.

An embodiment of the present invention provides an electrode for a rechargeable lithium battery, including: a current collector; and an active material layer on the current collector, wherein the active material layer includes an active material adapted to reversibly intercalate and deintercalate lithium ions, a binder, and a pore-forming polymer.

The pore-forming polymer may include a material selected from the group consisting of polyalkylene carbonate, polyalkylene oxide, polyalkylsiloxane, polyalkyl (meth)acrylate, copolymers thereof, and mixtures thereof.

The polyalkylene carbonate may include one or more repeating units of the following formula:

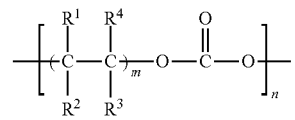

wherein $R^1$, $R^2$, $R^3$, and $R^4$ are each independently selected from the group consisting of hydrogen, an alkyl, an aryl, an alkoxide, and combinations thereof, m is an integer ranging from 10 to 90, and n is an integer ranging from 10 to 10,000.

The pore-forming polymer may have a weight average molecular weight ranging from about 500 to about 1,000,000.

The pore-forming polymer may be present in an amount ranging from about 5 to about 20 parts by weight based on 100 parts by weight of the binder.

The pore-forming polymer is present in the amount ranging from about 5 to about 10 parts by weight based on 100 parts by weight of the binder.

An embodiment of the present invention provides a rechargeable lithium battery including: a positive electrode; a negative electrode; and an electrolyte including a non-aqueous solvent and a lithium salt, wherein at least one of the positive electrode or the negative electrode includes a current collector, and an active material layer, having a porosity ranging from about 20 to about 80 volume %, on the current collector.

The electrolyte may include a pore-forming polymer selected from the group consisting of polyalkylene carbonate, polyalkylene oxide, polyalkylsiloxane, polyalkyl (meth)acrylate, copolymers thereof, and mixtures thereof.

The polyalkylene carbonate may include one or more repeating units of the following formula:

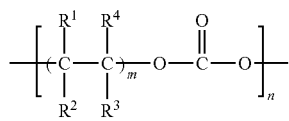

wherein $R^1$, $R^2$, $R^3$, and $R^4$ are each independently selected from the group consisting of hydrogen, an alkyl, an aryl, an alkoxide, and combinations thereof, m is an integer ranging from 10 to 90, and n is an integer ranging from 10 to 10,000.

The pore-forming polymer may have a weight average molecular weight ranging from about 500 to about 1,000,000.

The pore-forming polymer may be present in an amount of about 10 wt % or less based on the total weight of the electrolyte.

The pore-forming polymer may be present in the amount ranging from about 1 to about 5 wt % based on the total weight of the electrolyte.

An embodiment of the present invention provides a method of fabricating a rechargeable lithium battery, the method including: preparing a composition for forming an active material layer including an active material, a binder, and a pore-forming polymer; applying the composition for forming the active material layer on a current collector; drying the composition on the current collector to form an active material layer on the current collector to fabricate an electrode; interposing a separator between fabricated electrodes to fabricate an electrode assembly; and injecting an electrolyte to the battery case to elute the pore-forming polymer in the active material layer, after disposing the electrode assembly in a battery case.

The pore-forming polymer may be selected from the group consisting of polyalkylene carbonate, polyalkylene oxide, polyalkylsiloxane, polyalkyl(meth)acrylate, copolymers thereof, and mixtures thereof.

The polyalkylene carbonate may include one or more repeating units represented by the following formula:

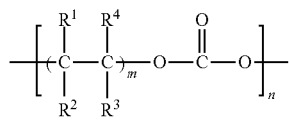

wherein $R^1$, $R^2$, $R^3$, and $R^4$ are independently selected from the group consisting of hydrogen, an alkyl, an aryl, an alkoxide, and combinations thereof, m is an integer ranging from 10 to 90, and n is an integer ranging from 10 to 10,000.

The pore-forming polymer may have a weight average molecular weight ranging from about 500 to about 1,000,000.

The pore-forming polymer may be present in an amount ranging from about 5 to about 20 parts by weight based on 100 parts by weight of the binder.

The pore-forming polymer may be present in the amount ranging from about 5 to about 10 parts by weight based on 100 parts by weight of the binder.

The binder may include a material selected from the group consisting of polyvinylchloride, polyvinylfluoride, a polymer including ethylene oxide, polyvinyl alcohol, carboxylated polyvinylchloride, polyvinylidene fluoride, polyimide, polyurethane, an epoxy resin, nylon, a styrene-butadiene rubber, an acrylated styrene-butadiene rubber, and mixtures thereof.

The binder may be present in an amount ranging from about 3 to about 20 wt % based on the total weight of the composition for forming the active material layer.

DETAILED DESCRIPTION OF THE EMBODIMENTS

In certain embodiments, positive and negative electrodes of rechargeable lithium batteries can be fabricated by applying slurry compositions including active materials, binders, and optionally conductive agents on current collectors. Aluminum can be utilized to form a positive current collector, and copper can be utilized to form a negative electrode.

In a rechargeable lithium battery, active materials in an electrode may expand and contract when the rechargeable lithium battery is charged and discharged. In particular, a metal alloy-based or silicon-based negative active material has a severe volume change problem. The volume change of the active materials may deteriorate cycle-life characteristics of the rechargeable lithium battery.

In order to solve the above problem, an embodiment of the present invention provides a porous electrode including a polymer that can be dissolved by an electrolyte solution, so that it can be utilized as a buffer against volume change of an active material when the rechargeable lithium battery is being charged and discharged, and thereby can improve cycle-life characteristics thereof.

Figure 1:
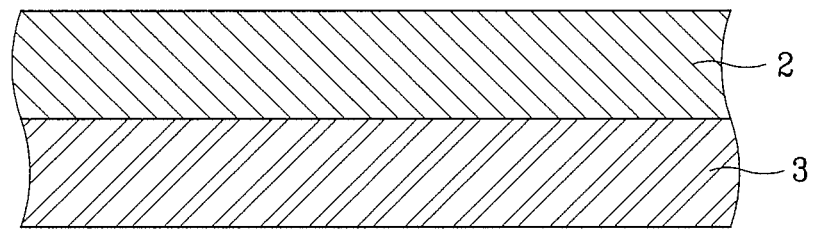
FIG. 1 shows a cross-sectional view of an electrode according to an embodiment of the present invention.

FIG. 1 shows a cross-sectional view of an electrode for a rechargeable lithium battery according to one embodiment of the present invention, but the present invention is not limited thereto.

Referring to FIG. 1, an electrode 1 includes a current collector 2 and an active material layer 3 disposed on the current collector 2.

The current collector 2 may include (or be) a copper foil, a nickel foil, a stainless steel foil, a titanium foil, a nickel foam, a copper foam, and/or a polymer material coated with a conductive metal. According to another embodiment, it may include a copper foil or a nickel foil. The polymer may be selected from the group consisting of polyethylene terephthalate, polyimide, polytetrafluoroethylene, polyethylene naphthalate, polypropylene, polyethylene, polyester, polyvinylidene fluoride, polysulfone, and mixtures thereof.

The active material layer 3 includes an active material that is capable of reversibly intercalating and deintercalating lithium ions, a binder, and a pore-forming polymer.

The pore-forming polymer is dissolved in an electrolyte solution when a battery is fabricated, and thereby plays a role of forming pores inside the active material layer (or electrode active material layer) 3. Herein, the pores inside the electrode active material layer 3 can have various suitable sizes, distribution, and porosity depending on the size, amount, and treatment method of a pore-forming polymer.

In one embodiment, the pore-forming polymer is selected from the group consisting of polyalkylene carbonate, polyalkylene oxide, polyalkylsiloxane, polyalkyl(meth)acrylate, copolymers thereof, and mixtures thereof. According to one embodiment, the polyalkylene carbonate including the one or more repeating units of the following Chemical Formula 1 may be appropriate for the pore-forming polymer.

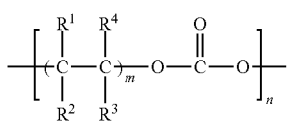

Chemical Formula 1

In the above Chemical Formula 1, $R^1$, $R^2$, $R^3$, and $R^4$ are each independently selected from the group consisting of hydrogen, an alkyl, an aryl, an alkoxide, and combinations thereof, m is an integer ranging from 10 to 90, and n is an integer ranging from 10 to 10,000. In addition, at least one among the $R^1$ to $R^4$ is an alkyl.

The alkyl has 1 to 10 carbons. The aryl has 6 to 30 carbons, and the alkoxide has 1 to 10 carbons.

According to one embodiment, the pore-forming polymer may be selected from the group consisting of poly(propylenecarbonate), polyethylene carbonate, polyethylene oxide, polypropylene oxide, polydimethyl siloxane, polymethyl (meth)acrylate, polyethyl(meth)acrylate, polybutyl(meth)acrylate, copolymers thereof, and mixtures thereof.

The pore-forming polymer has a weight average molecular weight ranging from about 500 to about 1,000,000 (or from 500 to 1,000,000). According to one embodiment, the pore-forming polymer has a weight average molecular weight ranging from about 1000 to about 50,000 (or from 1000 to 50,000). When it has an average molecular weight of less than 500, the electrode layer may have decreased adhesion to a current collector. On the other hand, when it has an average molecular weight of more than 1,000,000, it may not be easily eluted in an electrolyte solution.

The pore-forming polymer may be present in an amount ranging from about 5 to about 20 parts (or from 5 to 20 parts) by weight based on 100 parts by weight of a binder. According to another embodiment, the pore-forming polymer may be present in an amount ranging from about 5 to about 10 parts (or from 5 to 10 parts) by weight based on 100 parts by weight of a binder. When a pore-forming polymer is present at less than 5 parts by weight, the electrode may not have a desired porosity. On the other hand, when it is present at more than 20 parts by weight, an electrode may have deteriorated mechanical strength after the pore-forming polymer is eluted.

The active material layer 3 can be electrochemically oxidized/reduced and includes an active material that is capable of reversibly intercalating and deintercalating lithium ions.

The active material capable of reversibly intercalating and deintercalating lithium ions may include an appropriate compound depending on uses of an electrode. In other words, an electrode can be used as a positive electrode or a negative electrode depending on kinds of active material included in an active material layer.

When the electrode 1 is adapted to be a negative electrode, the active material layer 3 includes a material selected from the group consisting of lithium, a metal that can alloy with lithium, a carbonaceous material, and a composite material including the metal material and the carbonaceous material. The metal that can alloy with lithium may include Al, Si, Sn, Pb, Zn, Bi, In, Mg, Ga, Cd, Ag, Ge, Ti, and the like. In addition, the negative active material may include metal lithium. The carbonaceous material may include artificial (or synthetic) graphite, natural graphite, graphitized carbon fiber, graphitized mesocarbon microbeads, amorphous carbon, etc. The amorphous carbon may include soft carbon (carbon fired at a low temperature) and/or hard carbon (carbon fired at a high temperature), and/or crystalline carbon such as plate-shaped, spherical-shaped, or fiber-typed natural graphite and/or artificial graphite.

When the electrode 1 is adapted to be a positive electrode, the active material layer 3 includes a lithiated intercalation compound capable of reversibly intercalating and deintercalating lithium ions. Specifically, the positive active material includes a composite oxide including lithium and a metal selected from the group consisting of cobalt, manganese, nickel, and combinations thereof. More specifically, nonlimiting examples of suitable positive active materials include those represented in the following Chemical Formulas 2 to 25.

Chemical Formula 2

In Formula 2, $0.95 \leq a \leq 1.1$ and $0 \leq b \leq 0.5$.

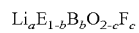
Chemical Formula 3

In the Formula 3, $0.95 \leq a \leq 1.1$, $0 \leq b \leq 0.5$, and $0 \leq c \leq 0.05$.

Chemical Formula 4

In Formula 4, $0 \leq b \leq 0.5$ and $0 \leq c \leq 0.05$.

Chemical Formula 5

In Formula 5, $0.95 \leq a \leq 1.1$, $0 \leq b \leq 0.5$, $0 \leq c \leq 0.05$, and $0 < \alpha \leq 2$.

Chemical Formula 6

In Formula 6, $0.95 \leq a \leq 1.1$, $0 \leq b \leq 0.5$, $0 \leq c \leq 0.05$, and $0 < \alpha < 2$.

Chemical Formula 7

In Formula 7, $0.95 \leq a \leq 1.1$, $0 \leq b \leq 0.5$, $0 \leq c \leq 0.05$, and $0 < \alpha < 2$.

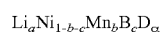
Chemical Formula 8

In Formula 8, $0.95 \leq a \leq 1.1$, $0 \leq b \leq 0.5$, $0 \leq c \leq 0.05$, and $0 < \alpha \leq 2$.

Chemical Formula 9

In Formula 9, $0.95 \leq a \leq 1.1$, $0 \leq b \leq 0.5$, $0 \leq c \leq 0.05$, and $0 < \alpha < 2$.

Chemical Formula 10

In Formula 10, $0.95 \leq a \leq 1.1$, $0 \leq b \leq 0.5$, $0 \leq c \leq 0.05$, and $0 < \alpha < 2$.

Chemical Formula 11

In Formula 11, $0.90 \leq a \leq 1.1$, $0 \leq b \leq 0.9$, $0 \leq c \leq 0.9$, and $0.001 \leq d \leq 0.2$.

Chemical Formula 12

In Formula 12, $0.90 \leq a \leq 1.1$, $0 \leq b \leq 0.9$, $0 \leq c \leq 0.5$, $0 \leq d \leq 0.5$, and $0.001 \leq e \leq 0.2$.

Chemical Formula 13

In Formula 13, $0.90 \leq a \leq 1.1$ and $0.001 \leq b \leq 0.1$.

Chemical Formula 14

In Formula 14, $0.90 \leq a \leq 1.1$ and $0.001 \leq b \leq 0.1$.

Chemical Formula 15

In Formula 15, $0.90 \leq a \leq 1.1$ and $0.001 \leq b \leq 0.1$.

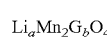
Chemical Formula 16

In Formula 16, $0.90 \leq a \leq 1.1$ and $0.001 \leq b \leq 0.2$.

Chemical Formula 17

Chemical Formula 18

Chemical Formula 19

Chemical Formula 20

Chemical Formula 21

$LiIO_2$          Chemical Formula 22

$LiNiVO_4$          Chemical Formula 23

$Li_{3-f}J_2(PO_4)_3 (0 \leq f \leq 3)$          Chemical Formula 24

$Li_{3-f}Fe_2(PO_4)_3 (0 \leq f \leq 2)$          Chemical Formula 25

In the above Chemical Formulas 2 to 25, A is selected from the group consisting of Ni, Co, Mn, and combinations thereof; B is selected from the group consisting of Al, Ni, Co, Mn, Cr, Fe, Mg, Sr, V, a rare earth element, and combinations thereof; D is selected from the group consisting of O, F, S, P, and combinations thereof; E is selected from the group consisting of Co, Mn and combinations thereof; F is selected from the group consisting of F, S, P, and combinations thereof; G is a transition and/or lanthanide metal (or element) selected from the group consisting of Al, Cr, Mn, Fe, Mg, La, Ce, Sr, V, and combinations thereof, Q is selected from the group consisting of Ti, Mo, Mn, and combinations thereof; I is selected from the group consisting of Cr, V, Fe, Sc, Y, and combinations thereof; and J is selected from the group consisting of V, Cr, Mn, Co, Ni, Cu, and combinations thereof.

In addition, the positive active material may include inorganic sulfur ($S_8$, elemental sulfur) and a sulfur-based compound. The sulfur-based compound may include $Li_2S_n$ (n≥1), $Li_2S_n$ (n≥1) dissolved in a catholyte, an organic sulfur compound, a carbon-sulfur polymer (($C_2S_f)_n$: f=2.5 to 50, n≥2), or the like.

The active material is present in an amount ranging from about 80 to about 98 wt % (or from 80 to 98 wt %) based on the total weight of an active material layer, but according to another embodiment of the present invention, it may be included in an amount ranging from about 90 to about 96 wt % (or from 90 to 96 wt %). When the active material is present in an amount that is less than 80 wt %, the electrode may have too low of energy storage density. On the other hand, when the active material is present in an amount that is more than 98 wt %, the electrode may have decreased processibility.

The active material layer also includes a binder for improvement of its adherence to a current collector.

Nonlimiting examples of the binder include polyvinylchloride, polyvinyl fluoride, a polymer including ethylene oxide, polyvinyl alcohol, carboxylated polyvinylchloride, polyvinylidene fluoride, polyimide, polyurethane, an epoxy resin, nylon, a styrene-butadiene rubber, an acrylated styrene-butadiene rubber, and mixtures thereof.

In one embodiment, the binder is present in an amount ranging from about 1.5 to about 15 wt % (or from 1.5 to 15 wt %) based on the total weight of the active material layer. According to one embodiment, the binder is present in an amount ranging from about 3 to about 10 wt % (or from 3 to 10 wt %) based on the total weight of the active material layer. According to another embodiment, the binder is present in an amount ranging from about 5 to about 10 wt % (or from 5 to 10 wt %) based on the total weight of the active material layer. When the binder is included in an amount of less than 1.5 wt %, the electrode may have deteriorated mechanical strength and adhesion strength to result in deteriorated electrochemical characteristics (coulomb efficiency and cycle-life characteristic). On the other hand, when included in an amount of more than 15 wt %, a battery may not be fabricated to have high capacity.

The positive active material layer also includes a conductive agent for improving electrical conductivity.

Any suitable electrically conductive material can be used as a conductive agent unless it causes a chemical change. Nonlimiting examples of the conductive agent include natural graphite, artificial graphite, carbon black, acetylene black, ketjen black, a carbon fiber, a metal powder and/or fiber including copper, nickel, aluminum, silver, etc., and/or a polyphenylene derivative.

When the electrode contacts an electrolyte to fabricate a battery and thereby contacts a solvent in the electrolyte, a pore-forming polymer in an active material layer is eluted and pores are formed in the active material layer.

In other words, pores can be easily formed in the active material layer, depending on the kind of pore-forming polymer. Since the active material layer can include pores that can be freely controlled, it can absorb a volume change according to expansion and contraction of an active material during the battery operation, and can thereby suppress expansion of the electrode and the battery to improve the cycle-life characteristic of the battery. Also, an embodiment of the present invention can have better effects on a negative electrode than other electrodes because the negative electrode includes a metal material that is capable of being alloyed with lithium, which has a relatively large volume change.

According to another embodiment of the present invention, the present invention provides a rechargeable lithium battery including the electrode.

Illustrating in more detail, a method for fabricating the rechargeable lithium battery includes: a first step S1 of preparing a composition for forming an active material layer including an active material, a binder, and a pore-forming polymer; a second step S2 of fabricating an electrode by coating the composition for forming an active material layer on a current collector to form an active material layer; a third step S3 of preparing an electrode assembly by inserting a separator between the electrodes; and a forth step S4 of eluting a pore-forming polymer after inserting the electrode assembly in a battery case and then injecting an electrolyte solution therein.

Figure 2:
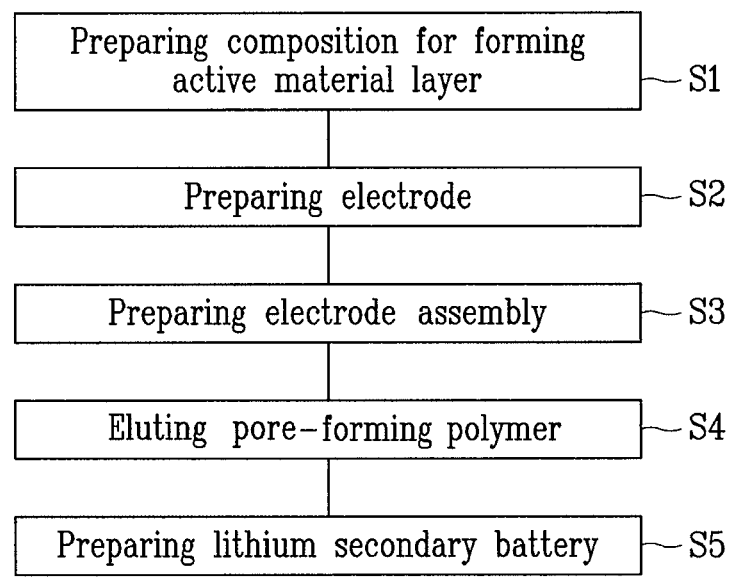
FIG. 2 is a flow chart showing a method of fabricating a rechargeable lithium battery according to an embodiment of the present invention.

FIG. 2 is a flow chart showing a method of fabricating a rechargeable lithium battery according to an embodiment of the present invention. Illustrating in more detail with reference to FIG. 2, an active material, a binder, and a pore-forming polymer are mixed in a solvent to prepare a composition for forming an active material layer (S1).

The active material, the binder, and the pore-forming polymer are the same (or substantially the same) as described above.

In one embodiment, the active material may be included in an amount ranging from about 10 to about 80 wt % (or from 10 to 80 wt %) based on the total weight of a composition for forming an active material layer. According to another embodiment, the active material may be included in an amount ranging from about 20 to about 50 wt % (or from 20 to 50 wt %). When the active material is included in an amount that is less than 10 wt %, the electrode may have low energy storage density. On the other hand, when the active material is included in an amount that is over 80 wt %, the electrode may have deteriorated formation.

In addition, the binder may be included in an amount ranging from about 0.1 to about 20 wt % (or from 0.1 to 20 wt %) based on the total weight of a composition for forming an active material layer. According to another embodiment, the active material may be included in an amount ranging from about 5 to about 10 wt % (or from 5 to 10 wt %). When the binder is present in an amount of less than 0.1 wt %, the electrode may have deteriorated mechanical strength and adherent strength, thereby resulting in deteriorated electrochemical characteristic (coulomb efficiency, cycle-life characteristic). On the other hand, when the binder is present in an amount of more than 20 wt %, the battery may not have high capacity.

The pore-forming polymer may be included in an amount ranging from about 5 to about 20 parts (or from 5 to 20 parts) by weight based on 100 parts by weight of a binder. According to another embodiment, the pore-forming polymer may be included in an amount ranging from about 5 to about 10 parts (or from 5 to 10 parts) by weight. When the pore-forming polymer is included in an amount of less than 5 parts by weight, the electrode may not have desired porosity. On the other hand, when the pore-forming polymer is included in an amount of more than 20 parts by weight, the electrode may have deteriorated mechanical strength after the pore-forming polymer is eluted.

The composition for forming the active material layer may include a conductive agent other than the aforementioned components. For the conductive agent, any electrically conductive material can be used unless it causes a chemical change.

Examples of the solvent include alcohols such as methanol, ethanol, and isopropanol, hexane, chloroform, tetrahydrofuran, ether, methylene chloride, acetone, acetonitrile, N-methyl pyrrolidone (NMP), and so on, but are not limited thereto. The solvent is included in a balance amount.

Then, the composition for forming an active material layer is coated on a current collector and dried to form an active material layer (S2).

The current collector is the same (or substantially the same) as aforementioned.

A method of coating the composition for forming an active material layer on a current collector may include a general slurry coating method. In particular, it may include screen printing, spray coating, a doctor blade method, gravure coating, dip-coating, silk screening, or painting, but is not limited thereto.

The electrode can be used as a positive electrode and/or a negative electrode active material layer depending on the kinds of active material.

Then, a separator is positioned between the positive electrode and the negative electrode to prepare an electrode assembly (S3).

The separator may include polyethylene, polypropylene, polyvinylidene fluoride, and multilayers thereof such as a polyethylene/polypropylene bilayered separator, a polyethylene/polypropylene/polyethylene three-layered separator, and a polypropylene/polyethylene/polypropylene three-layered separator.

Next, the electrode assembly is inserted in a case (or can), and the case is sealed with a cap plate. Then, an electrolyte solution is injected through an opening on the cap plate. Herein, a pore-forming polymer is eluted by the electrolyte solution (S4), and a rechargeable lithium battery is then prepared (or fabricated) (S5).

The electrolyte includes a lithium salt dissolved in a non-aqueous organic solvent.

The lithium salts act as a lithium-ion source, facilitating basic battery operation. According to one embodiment of the present invention, the lithium salt includes a material selected from the group consisting of $LiPF_6$, $LiBF_4$, $LiSbF_6$, $LiAsF_6$, $LiClO_4$, $LiCF_3SO_3$, $LiC_4F_9SO_3$, $LiN(CF_3SO_2)_2$, $LiN(C_2F_5SO_2)_2$, $LiAlO_2$, $LiAlCl_4$, $LiN(C_pF_{2p+1}SO_2)(C_qF_{2q+1}SO_2)$, wherein p and q are natural numbers, LiBOB, LiFOB, LiCl, LiI, and combinations thereof.

The lithium salt may be used at a concentration ranging from about 0.6 to about 2.0 M (or from 0.6 to 2.0 M). According to one embodiment, the lithium salt may be used at a concentration ranging from about 0.7 to about 1.6 M (or from 0.7 to 1.6 M). When the lithium salt concentration is less than 0.6 M, electrolyte performance may be deteriorated due to low electrolyte conductivity. By contrast, when the lithium salt concentration is more than 2.0 M, lithium ion mobility may be reduced due to an increase of electrolyte viscosity.

The non-aqueous organic solvent acts as a medium for transmitting ions taking part in the electrochemical reaction of the battery. The non-aqueous organic solvent may include a carbonate-based, ester-based, ether-based, ketone-based, alcohol-based, or aprotic solvent. Nonlimiting examples of the carbonate-based solvent include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and so on. Nonlimiting examples of the ester-based solvent include methyl acetate, ethyl acetate, n-propyl acetate, dimethylacetate, methylpropionate, ethylpropionate, γ-butyrolactone, decanolide, valerolactone, mevalonolactone, caprolactone, and so on. Nonlimiting examples of the ether-based solvent include dibutyl ether, tetraglyme, diglyme, dimethoxyethane, 2-methyltetrahydrofuran, tetrahydrofuran, and so on, and nonlimiting examples of the ketone-based solvent include cyclohexanone and so on. Nonlimiting examples of the aprotic solvent include a nitrile such as X—CN (wherein X is a C2 to C20 linear, branched, or cyclic hydrocarbon, a double bond, an aromatic ring, or an ether bond), an amide such as dimethylformamide, and a dioxolane such as 1,3-dioxolane, sulfolane, and so on.

The non-aqueous organic solvent may be used singularly or as a mixture. When the organic solvent is used as a mixture, the mixture ratio can be suitably controlled in accordance with a desirable battery performance.

The carbonate-based solvent may include a mixture of a cyclic carbonate and a linear carbonate. The cyclic carbonate and the linear carbonate are mixed together in a volume ratio ranging from about 1:1 to about 1:9 (or from 1:1 to 1:9), and when this mixture is used as an electrolyte, the electrolyte performance may be enhanced.

In addition, the non-aqueous organic solvent may include mixtures of carbonate-based solvents and aromatic hydrocarbon-based solvents. The carbonate-based solvents and the aromatic hydrocarbon-based solvents are mixed together in a volume ratio ranging from about 1:1 to about 30:1 (or from 1:1 to 30:1).

The aromatic hydrocarbon-based organic solvent may be represented by the following Chemical Formula 26:

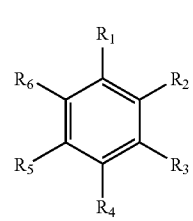

Chemical Formula 26

In Formula 26, $R_1$ to $R_6$ are each independently selected from the group consisting of hydrogen, a halogen, a C1 to C10 alkyl, a haloalkyl, and combinations thereof.

Nonlimiting examples of suitable aromatic hydrocarbon-based organic solvent include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and combinations thereof.

The non-aqueous electrolyte may additionally include an additive like an overcharge inhibitor such as pyrocarbonate, and the like.

When a rechargeable lithium battery is fabricated in the aforementioned manufacturing method, it includes pores inside an active material layer of an electrode.

Specifically, a rechargeable lithium battery fabricated according to the manufacturing method includes a positive electrode, a negative electrode, and an electrolyte including a non-aqueous solvent and a lithium salt. At least one of the positive electrode or the negative electrode includes a current collector and an active material layer disposed on the current collector. The active material layer has porosity ranging from about 20 to about 80% (or from 20 to 80%).

According to another embodiment of the present invention, the active material layer has porosity ranging from about 20 to about 70% (or from 20 to 70%), and according to still another embodiment, it can have porosity ranging from about 20 to about 60% (or from 20 to 60%).

When the active material layer has less than 20% porosity, it may not have enough of a buffering effect against volume change of an active material. On the other hand, when the active material layer has more than 80% porosity, it may deteriorate energy density.

In one embodiment, the electrolyte of the rechargeable lithium battery also includes a pore-forming polymer included in the active material layer and eluted therefrom. The eluted pore-forming polymer can be detected by a FT-IR or $^1$H NMR. In addition, an electrolyte solution including the eluted pore-forming polymer is vacuum-dried at 100° C. to volatilize an organic solvent, and then the remaining material can be washed with water, alcohol, and dimethylcarbonate and then dried to result in only (or substantially only) the eluted pore-forming polymer.

In one embodiment, the pore-forming polymer exists in an amount of 10 wt % or less (or less than 10 wt % or less then about 10 wt %) in an electrolyte, but according to another embodiment of the present invention, it is included in an amount ranging from about 1 to about 5 wt % (or from 1 to 5 wt %). When the pore-forming polymer remains in an amount of more than 5 wt % in an electrolyte, the viscosity of the electrolyte may be too high.

Figure 3:
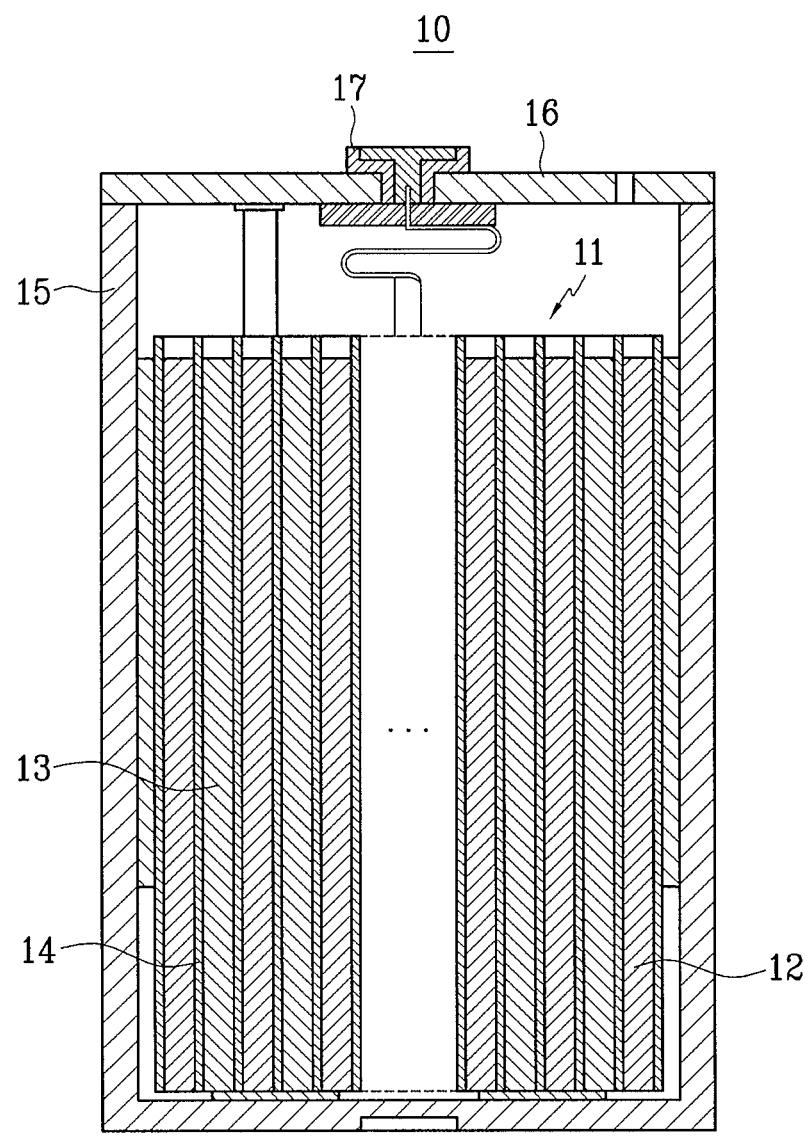
FIG. 3 is a cross-sectional view of a rechargeable lithium battery according to an embodiment of the present invention.

FIG. 3 shows a rechargeable lithium battery 10 having the above-mentioned structure according to an embodiment of the present invention.

The rechargeable lithium battery 10 includes an electrode assembly 11 including a positive electrode 12, a negative electrode 13, and a separator 14 interposed between the positive electrode 12 and the negative electrode 13. The electrode assembly 11 is placed in a battery case 15. An electrolyte is provided through the opening of the battery case 15, and the battery case is sealed with a cap plate 16 and a gasket 17.

The following examples illustrate the present invention in more detail. However, the present invention is not limited by these examples.

EXAMPLE 1

0.1 g of pore-forming poly(propylene carbonate) with a weight average molecular weight of 50,000 was dissolved in 30 ml of N-methylpyrrolidone. Then, 4.5 g of silicon as a negative active material and 0.5 g of polyimide as a binder were added to the prepared solution to prepare a composition for forming a negative active material layer. For example, the composition was fabricated with 20 parts by weight of poly(propylene carbonate) based on 100 parts by weight of the binder.

The composition for forming the negative active material layer was coated on a Cu film as a current collector in a screen printing method, and then dried for one hour at 400° C. under a nitrogen atmosphere to thereby prepare a negative electrode.

In contrast, $LiCoO_2$ as a positive active material, polyvinylidene fluoride (PVDF) as a binder, and carbon as a conductive agent were mixed in a weight ratio of 92:4:4. The resulting mixture was dispersed into N-methyl-2-pyrrolidone, thereby preparing a composition for forming a positive active material layer.

This composition was coated to be 20 μm thick on an aluminum foil, and then dried and compressed to thereby prepare a positive electrode.

The electrodes were spirally wound with a 25 μm-thick polyethylene material separator. The resulting product was compressed and put in a 30 mm×48 mm×6 mm prismatic can. Then, an electrolyte solution was prepared by mixing propylene carbonate (PC), diethylcarbonate (DEC), and ethylene carbonate (EC) in a ratio of 1:1:1 and then, dissolved in 1.3 mol/L of $LiPF_6$. The electrolyte solution was then injected into the can to fabricate a coin-type cell.

EXAMPLE 2

A coin-type cell was fabricated in the same (or substantially the same) method as Example 1, except that 5 parts by weight of poly(propylene carbonate) with a weight average molecular weight of 50,000 for forming pores was used based on 100 parts by weight of a binder.

EXAMPLE 3

A coin-type cell was fabricated according to the same (or substantially the same) method as Example 1, except that 10 parts by weight of poly(propylene carbonate) with a weight average molecular weight of 50,000 for forming pores was used based on 100 parts by weight of a binder.

EXAMPLE 4

A coin-type cell was fabricated according to the same (or substantially the same) method as Example 1, except that 15 parts by weight of poly(ethylene oxide) with a weight average molecular weight of 50,000 for forming pores was used based on 100 parts by weight of a binder. Here, the negative active material layer had porosity of 65%.

EXAMPLE 5

A coin-type cell was fabricated according to the same (or substantially the same) method as Example 1, except that 10 parts by weight of poly(dimethylsiloxane) with a weight average molecular weight of 100,000 for forming pores was used based on 100 parts by weight of a binder. Here, the negative active material layer had porosity of 50%.

EXAMPLE 6

A coin-type cell was fabricated according to the same (or substantially the same) method as Example 1, except that 10 parts by weight of polyethylmethacrylate with a weight average molecular weight of 1,000,000 for forming pores was used based on 100 parts by weight of a binder. Here, the negative active material layer had porosity of 35%.

COMPARATIVE EXAMPLE 1

4.5 g of silicon as a negative active material and 0.5 g of polyimide as a binder were added to 30 ml of N-methylpyrrolidone to prepare a composition for forming a negative active material layer.

The composition was coated on a Cu foil as a current collector in a screen printing method, dried at 400° C. under a nitrogen atmosphere, and compressed to thereby prepare a negative electrode.

In contrast, $LiCoO_2$ as a positive active material, polyvinylidene fluoride (PVDF) as a binder, and carbon as a conductive agent were mixed in a weight ratio of 92:4:4. The mixture was dispersed in N-methyl-2-pyrrolidone to prepare a composition for forming a positive active material layer. The composition was coated on a 20 μm-thick aluminum foil and dried and compressed to prepare a positive electrode.

The prepared electrodes were spirally wound with a 25 μm-thick polyethylene separator. The resulting product was inserted into a 30 mm×48 mm×6 mm prismatic can. Then, an electrolyte solution was prepared by mixing propylene carbonate (PC), diethylcarbonate (DEC), and ethylene carbonate (EC) in a ratio of 1:1:1, and then dissolved in 1.3 mol/L of $LiPF_6$. The electrolyte solution was then injected into the can to fabricate a coin-type cell.

COMPARATIVE EXAMPLE 2

4.5 g of a lithium powder as a negative active material and 0.5 g of polyimide as a binder were added to 30 ml of N-methylpyrrolidone to prepare a composition for forming a negative active material layer.

The composition was coated on a Cu foil as a current collector in a screen printing method, and then dried at 400° C. under a nitrogen atmosphere and compressed to thereby prepare a negative electrode.

In contrast, a composition for forming a positive active material layer was prepared by mixing $LiCoO_2$ as a positive active material, polyvinylidene fluoride (PVDF) as a binder, and carbon as a conductive agent in a weight ratio of 92:4:4, and then dispersing the mixture into N-methyl-2-pyrrolidone. This composition was coated on a 20 μm-thick aluminum foil, and then dried and compressed to fabricate a positive electrode.

The prepared electrodes were spirally wound with a 25 μm-thick polyethylene separator and then compressed. The resulting product was inserted into a 30 mm×48 mm×6 mm prismatic can. Then, an electrolyte solution was prepared by mixing propylene carbonate (PC), diethylcarbonate (DEC), ethylene carbonate (EC) in a ratio of 1:1:1, and dissolved in 1.3 mol/L of $LiPF_6$. The electrolyte was injected into a can to fabricate a coin-type cell.

In the negative electrodes included in rechargeable lithium batteries according to Examples 1 to 3 and Comparative Examples 1 and 2, the porosity and mass density in the negative active material layers were measured. The results are shown in the following Table 1.

TABLE 1

|  | Porosity (%) | Mass density (g/cc) |
|---|---|---|
| Example 1 | 65 | 1.1 |
| Example 2 | 45 | 1.3 |
| Example 3 | 55 | 1.25 |
| Comparative Example 1 | 40 | 1.4 |
| Comparative Example 2 | 40 | 1.0 |

The charges and discharges of the rechargeable lithium batteries according to Examples 1 to 3 and Comparative Examples 1 and 2 were evaluated.

In the evaluations, they were charged with 0.005 V or 1000 mAh/g at the initial charge and discharged up to 1.0V. Here, their C-rates were regulated with 0.2 C ↔ 0.2 C.

Then, they were charged up to the same potential as before and discharged up to 1.0V. Here, their cut-off voltages were 0.005V. Their C-rates also were regulated with 0.2 C ↔ 0.2 C as they were at the initial charge and discharge. Their cycle-life was calculated as a percentage ratio of capacity of the batteries after they were charged and discharged for 50 cycles at a 0.2 C rate vs. their initial capacity.

In addition, the expansion rate of the negative electrodes during the charge was measured. The results are shown in Table 2.

TABLE 2

|  | Expansion rate of negative electrode | Initial charge capacity [mAh/g] | Initial discharge capacity [mAh/g] | Initial efficiency [%] | Cycle-life [%] |
|---|---|---|---|---|---|
| Example 1 | 25% | 2460 | 2100 | 85.4 | 90 |
| Example 2 | 80% | 2300 | 1600 | 69.5 | 60 |
| Example 3 | 50% | 2400 | 1900 | 79.1 | 80 |
| Comparative Example 1 | 220% | 1900 | 350 | 18.4 | 25 |
| Comparative Example 2 | 250% | 2800 | 1000 | 35.7 | 10 |

As shown in Table 2, the batteries had various cycle-life characteristics depending on porosity and mass density in the active material layer. That is, in Examples 1 to 3, the batteries, each including an electrode with pores therein, have dramatically improved cycle-life as compared with that of Comparative Example 1, which did not include pores.

The battery of Comparative Example 2 had a relatively good Initial charge capacity but had a lower cycle-life characteristic than those of Examples 1 to 3 due to dendrite formation.

The charges and discharges of the rechargeable lithium batteries of Examples 4 to 6 were also evaluated by the same (or substantially the same) method. From the experiment results, they have the same (or substantially the same) level of battery characteristic and cycle-life characteristic as Example 2.

In view of the foregoing, one or more electrodes of an embodiment of the present invention provides a buffer function (or buffering function) when an active material has a volume change while being charged and discharged to thereby improve the cycle-life characteristic of a rechargeable lithium battery including the one or more electrodes.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode for a rechargeable lithium battery, comprising:
   a current collector; and
   an active material layer on the current collector,
   wherein the active material layer comprises an active material adapted to reversibly intercalate and deintercalate lithium ions, a binder, and a pore-forming polymer, and
   wherein the pore-forming polymer comprises a material selected from the group consisting of polyalkylene carbonate, polyalkylsiloxane, copolymers thereof, and mixtures thereof, and
   wherein the binder is present in an amount of about 0.1 to about 20 wt % based on the total weight of the active material layer, and the pore-forming polymer is present in an amount ranging from about 5 to about 20 parts by weight based on 100 parts by weight of the binder.

2. The electrode of claim 1, wherein the polyalkylene carbonate comprises one or more repeating units of the following formula:

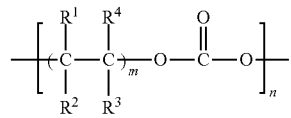

wherein $R^1$, $R^2$, $R^3$, and $R^4$ are each independently selected from the group consisting of hydrogen, an alkyl, an aryl, an alkoxide, and combinations thereof, m is an integer ranging from 10 to 90, and n is an integer ranging from 10 to 10,000.

3. The electrode of claim 1, wherein the pore-forming polymer has a weight average molecular weight ranging from about 500 to about 1,000,000.

4. The electrode of claim 1, wherein the pore-forming polymer is present in the amount ranging from about 5 to about 10 parts by weight based on 100 parts by weight of the binder.

5. The electrode of claim 1, wherein the electrode is a negative electrode and comprises a metal selected from the group consisting of Al, Si, Sn, Pb, Zn, Bi, In, Mg, Ga, Cd, Ag, Ge, Ti, and combinations thereof.

6. The electrode of claim 1, wherein the pore-forming polymer has a weight average molecular weight ranging from about 1,000 to about 50,000.

* * * * *